(12) United States Patent
Nguyen et al.

(10) Patent No.: US 11,255,176 B2
(45) Date of Patent: Feb. 22, 2022

(54) METHODS OF PROPPING CREATED FRACTURES AND MICROFRACTURES IN TIGHT FORMATION

(71) Applicant: Halliburton Energy Services, Inc., Houston, TX (US)

(72) Inventors: Philip D. Nguyen, Houston, TX (US); Ronald Glen Dusterhoft, Katy, TX (US); Dipti Singh, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 230 days.

(21) Appl. No.: 15/751,779

(22) PCT Filed: Oct. 29, 2015

(86) PCT No.: PCT/US2015/058129
§ 371 (c)(1),
(2) Date: Feb. 9, 2018

(87) PCT Pub. No.: WO2017/074400
PCT Pub. Date: May 4, 2017

(65) Prior Publication Data
US 2018/0238159 A1   Aug. 23, 2018

(51) Int. Cl.
*E21B 43/267* (2006.01)
*C09K 8/80* (2006.01)
(Continued)

(52) U.S. Cl.
CPC .............. *E21B 43/267* (2013.01); *C09K 8/66* (2013.01); *C09K 8/68* (2013.01); *C09K 8/685* (2013.01); *C09K 8/80* (2013.01); *C09K 8/805* (2013.01)

(58) Field of Classification Search
None
See application file for complete search history.

(56) References Cited

U.S. PATENT DOCUMENTS 6,776,235 B1 * 8/2004 England ................ E21B 43/267
166/271
2009/0170731 A1   7/2009 Stephens
(Continued)

FOREIGN PATENT DOCUMENTS

WO   2015041690 A1   3/2015

OTHER PUBLICATIONS

International Search Report and Written Opinion dated Jul. 26, 2016; International PCT Application No. PCT/US2015/058129.

*Primary Examiner* — Anuradha Ahuja
(74) *Attorney, Agent, or Firm* — McGuireWoods LLP

(57) ABSTRACT

A method of propping created fractures and microfractures in tight formation. The method includes injecting into a wellbore a first pad fluid stage; injecting into the wellbore a second pad fluid stage; injecting into the wellbore a diverting agent; and injecting into the wellbore a main proppant slurry stage; wherein the first pad fluid stage includes an aqueous-based fluid at a rate above the fracturing gradient to create a fracture, wherein the second pad fluid stage includes an aqueous-based fluid and a low concentration of a proppant mixture including a slurry of small proppant materials and/or a slurry of conventional proppant materials to extend the fracture and open up secondary induced fractures, and wherein the main proppant slurry stage includes an aqueous-based fluid and a proppant with a larger size than the small proppant particles in the second pad fluid stage.

16 Claims, 3 Drawing Sheets

(51) Int. Cl.
*C09K 8/68* (2006.01)
*C09K 8/66* (2006.01)

(56) References Cited

U.S. PATENT DOCUMENTS

| | | |
|---|---|---|
| 2009/0227480 A1 | 9/2009 | de Paiva Cortes et al. |
| 2011/0180259 A1 | 7/2011 | Willberg et al. |
| 2011/0265998 A1 | 11/2011 | Boronin et al. |
| 2013/0048282 A1 | 2/2013 | Adams et al. |
| 2013/0161003 A1* | 6/2013 | Makarychev-Mikhailov ............... C09K 8/685 166/280.1 |
| 2013/0284437 A1* | 10/2013 | Nguyen ................ E21B 43/267 166/280.1 |
| 2013/0312962 A1* | 11/2013 | Weaver ................ C09K 8/805 166/280.1 |
| 2014/0014338 A1* | 1/2014 | Crews ..................... E21B 43/26 166/280.1 |
| 2014/0251610 A1* | 9/2014 | Brannon ............... E21B 43/267 166/280.1 |
| 2014/0299317 A1 | 10/2014 | Johnson, Sr. |
| 2015/0083418 A1 | 3/2015 | Kruspe et al. |
| 2015/0107835 A1 | 4/2015 | Panga et al. |

\* cited by examiner

METHODS OF PROPPING CREATED FRACTURES AND MICROFRACTURES IN TIGHT FORMATION

TECHNICAL FIELD

A composition and method of propping created fractures and microfractures in tight formation is provided. The composition and the method overcome the effects of bedding planes as the fractures are being created in the shale formation. The method also ensures conductivity of the propped fracture and the complex fracture network, as well as communication with the wellbore, thereby enhancing and maintaining the well production.

BACKGROUND

Wells drilled in low-permeability subterranean formations are often treated by reservoir stimulation techniques, such as hydraulic fracturing, to increase their conductivity and thereby enhance recovery of hydrocarbons. Treatment fluids (pad fluids) are pumped at high pressure into the formation to create fractures in the formation. Proppants may be incorporated in the treatment fluids to prop open the created fractures when the surface treating pressure is released. A wide variety of materials may be used for proppant, but it includes a solid material, often sand or ceramic particles.

Over time, fracture size may decrease from mechanical failure (such as, crushing) of proppant, embedding of proppant into the fracture face of the well formation, etc. As the fracture begins to close, hydrocarbon production may decrease.

Based upon observation of natural fractures and formation rock fabric, it is envisioned that instead of forming planar fractures in the shale formations as in the conventional reservoirs, dominant fractures, secondary fractures, and branches with tortuous or zig-zag configurations are very likely generated.

Therefore, it is beneficial to develop a method for ensuring successful placement of propping agents in these complex fracture systems to support open fractures through complex tortuous paths and provide high conductivity paths to the wellbore.

BRIEF SUMMARY OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION OF THE INVENTION

As used herein, the words "comprise," "have," "include," and all grammatical variations thereof are each intended to have an open, non-limiting meaning that does not exclude additional elements or steps.

It should be understood that, as used herein, "first," "second," and "third," are assigned arbitrarily and are merely intended to differentiate between two or more fluids, etc., as the case may be, and does not indicate any sequence. Furthermore, it is to be understood that the mere use of the word "first" does not require that there be any "second," and the mere use of the word "second" does not require that there be any "third," etc.

As used herein, a "proppant" is either natural sand or man-made particulate. The proppant can be sand, treated sand or man-made ceramic materials, designed to keep an induced hydraulic fracture open, during or following a fracturing treatment.

As used herein, a "fluid" is a substance having an external phase that tends to flow and to conform to the outline of its container when the substance is tested at a temperature of 71° F. (22° C.) and a pressure of one atmosphere "atm" (0.1 megapascals "MPa"). A fluid can be a liquid or gas. Some fluids have only one phase or more than one distinct phase. A solution is an example of a fluid having only one phase, containing a solvent (e.g., water) and a solute. A colloid is an example of a fluid having more than one distinct phase. A colloid can be: a slurry, which includes an external liquid phase and undissolved solid particles as the internal phase; an emulsion, which includes an external liquid phase and at least one internal phase of immiscible liquid droplets; a foam, which includes an external liquid phase and a gas as the internal phase; or a mist, which includes an external gas phase and liquid droplets as the internal phase. There can be more than one internal phase of a colloid, but only one external phase. For example, there can be an external phase, which is adjacent to a first internal phase, and the first internal phase can be adjacent to a second internal phase. Any of the phases of a colloid can contain dissolved materials and/or undissolved solids. An emulsion generally contains an aqueous liquid as the external phase; whereas, an invert emulsion generally contains a liquid hydrocarbon as the external phase.

As used herein, the term "water based" means a fluid having an external phase comprising an aqueous liquid or a solution comprising an aqueous liquid as the solvent. As used herein, the term "oil based" means a fluid having an external phase comprising a hydrocarbon liquid or a solution comprising a hydrocarbon liquid as the solvent.

Figure 1A:
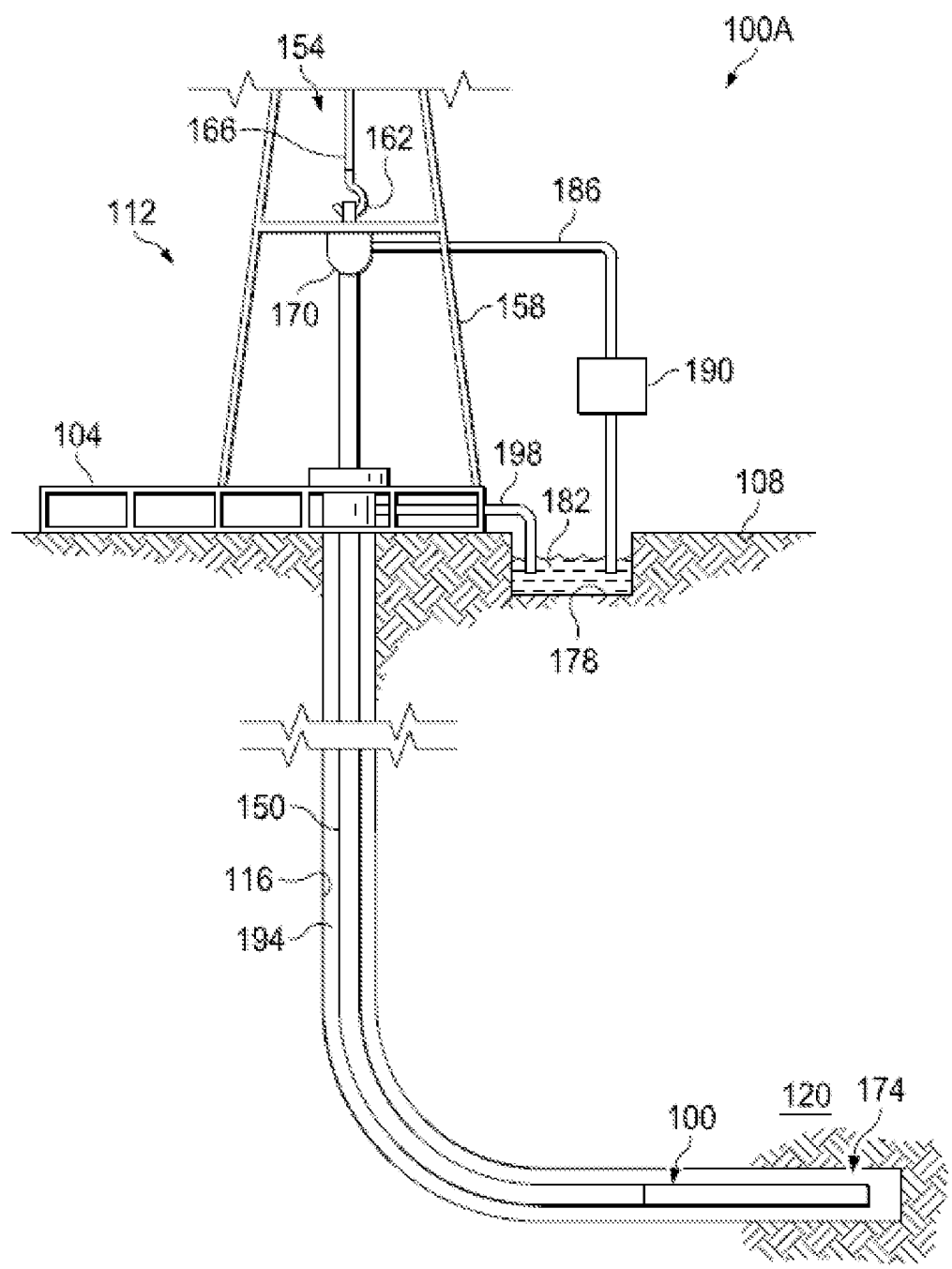
FIG. 1A illustrates a schematic view of an on-shore well using a wellbore fluid according to an illustrative embodiment.

FIG. 1A illustrates a schematic view of a rig 104 operating an onshore drilling or production system 100A according to an illustrative embodiment. Rig 104 is positioned at a surface 108 of a well 112. The well 112 includes a wellbore 116 that extends from the surface 108 of the well 112 to a subterranean substrate or formation 120. The well 112 and rig 104 are illustrated onshore in FIG. 1A.

Figure 1B:
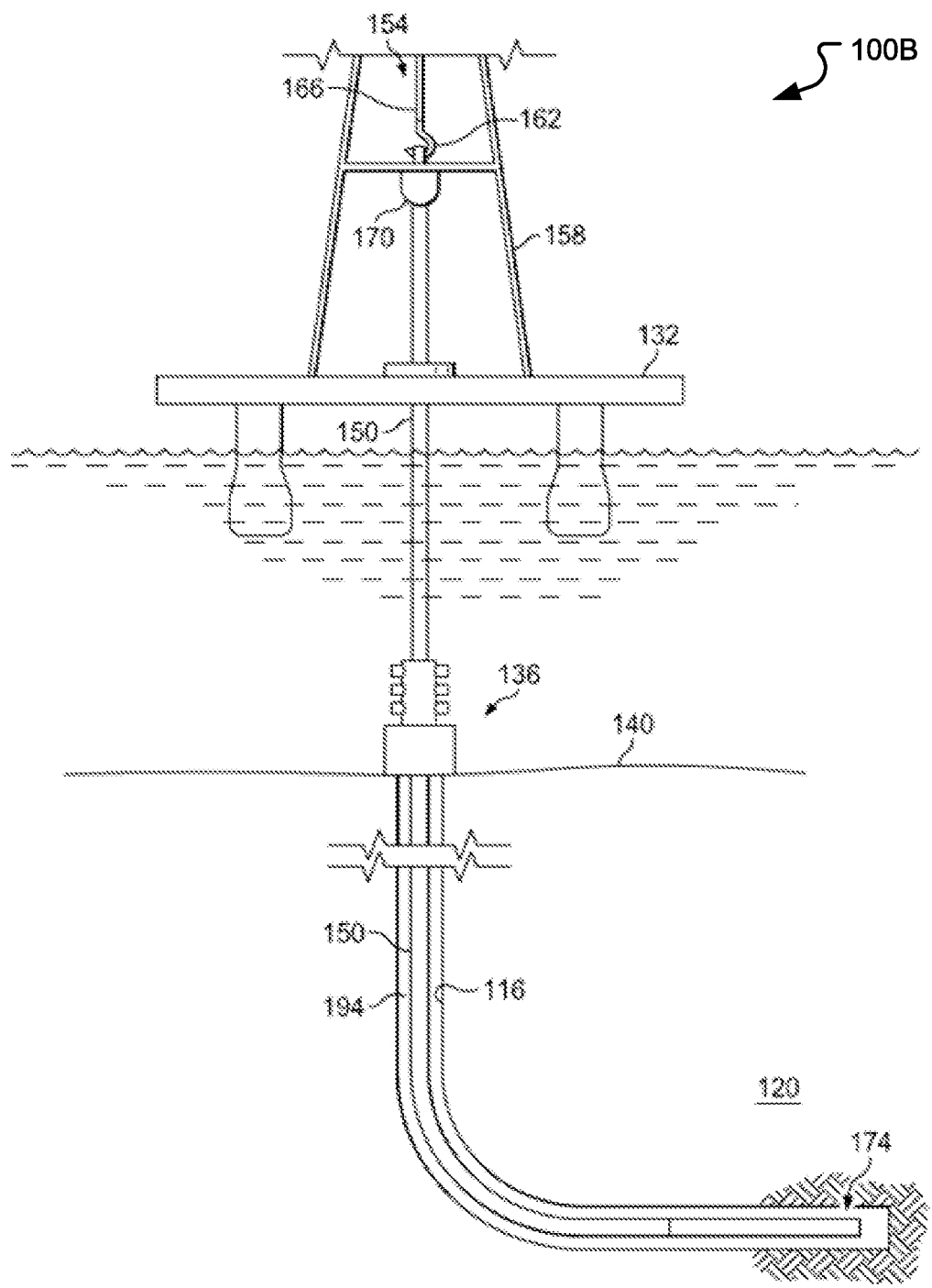
FIG. 1B illustrates a schematic view of an off-shore well using a wellbore fluid according to an illustrative embodiment.

Alternatively, FIG. 1B illustrates a schematic view of an off-shore platform 132 operating an offshore drilling or production system 100B according to an illustrative embodiment. The offshore drilling or production system 100B may be deployed in a sub-sea well 136 accessed by the offshore platform 132. The offshore platform 132 may be a floating platform or may instead be anchored to a seabed 140.

FIGS. 1A and 1B each illustrate possible uses or deployments of a wellbore fluid according to principles of this disclosure; and while the following description of the systems 100A-B primarily focuses on the use of the systems 100A-B during the completion and production stages, the systems 100A-B also may be used in other stages of the well.

In the embodiments illustrated in FIGS. 1A and 1B, the wellbore 116 has been formed by a drilling process in which dirt, rock and other subterranean materials are removed to create the wellbore 116. During or after the drilling process, a portion of the wellbore may be cased with a casing (not illustrated in FIGS. 1A and 1B). In other embodiments, the wellbore 116 may be maintained in an open-hole configuration without casing. The embodiments described herein are applicable to either cased or open-hole configurations of the wellbore 116.

After drilling of the wellbore 116 is complete and the associated drill bit and drill string are "tripped" from the wellbore 116, a work string or tubing string 150, which may eventually function as a production string, is lowered into the wellbore 116. The work string 150 may include sections of tubing, each of which are joined to adjacent tubing by threaded or other connection types. The work string may refer to the collection of pipes or tubes as a single component, or alternatively to the individual pipes or tubes that comprise the string. The term work string (or tubing string or production string) is not meant to be limiting in nature and may refer to any component or components that are capable of being coupled to the systems 100A-B to inject the wellbore fluid into the wellbore 116, or to provide energy to the systems 100A-B, such as that provided by fluids, electrical power or signals, or mechanical motion. Mechanical motion may involve rotationally or axially manipulating portions of the work string 150. In some embodiments, the work string 150 may include a passage disposed longitudinally in the work string 150 that is capable of allowing fluid communication between the surface 108 of the well 112 and a downhole location 174. The wellbore fluid may be injected into the well 112 via the passage.

The lowering of the work string 150 may be accomplished by a lift assembly 154 associated with a derrick 158 positioned on or adjacent to the rig 104, 132. The lift assembly 154 may include a hook 162, a cable 166, a traveling block (not shown), and a hoist (not shown) that cooperatively work together to lift or lower a swivel 170 that is coupled to an upper end of the work string 150. The work string 150 may be raised or lowered as needed to add additional sections of tubing to the work string 150 to position the systems 100A-B at the downhole location 174 in the wellbore 116.

A reservoir 178 may be positioned at the surface 108 to hold a fluid 182 (e.g., hydrocarbon, wellbore fluid, pad fluid, or the like) for delivery to the well 112 during setting of the systems 100A-B. A supply line 186 is fluidly coupled between the reservoir 178 and the passage of the work string 150. A pump 190 drives the fluid 182 through the supply line 186 and the work string 150 toward the downhole location 174. As described in more detail below, the fluid 182 may also be used to carry out debris from the wellbore prior to or during the completion process. After traveling downhole, the fluid 182 returns to the surface 108 by way of an annulus 194 between the work string 150 and the wellbore 116. At the surface 108, the fluid may be returned to the reservoir 178 through a return line 198. The fluid 178 may be filtered or otherwise processed prior to recirculation through the well 112. The fluid 182 may include various pad fluids in accordance with the present disclosure.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir.

A well can include, without limitation, an oil, gas or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore, which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During wellbore operations, it is common to introduce a treatment fluid (pad fluid) into the well. Examples of common treatment fluids include, but are not limited to, drilling fluids, spacer fluids, completion fluids, work-over fluids, production enhancement fluids, such as fracturing and acidizing fluids, and packer fluids. As used herein, a "treatment fluid" is a fluid designed and prepared to resolve a specific condition of a well or subterranean formation, such as for stimulation, isolation, gravel packing, or control of gas or water coning. The term "treatment fluid" refers to the specific composition of the fluid as it is being introduced into a well. The word "treatment" in the term "treatment fluid" does not necessarily imply any particular action by the fluid.

In an aspect of the present disclosure, a method for propping created fractures and microfractures in tight formation is disclosed.

Figure 2:
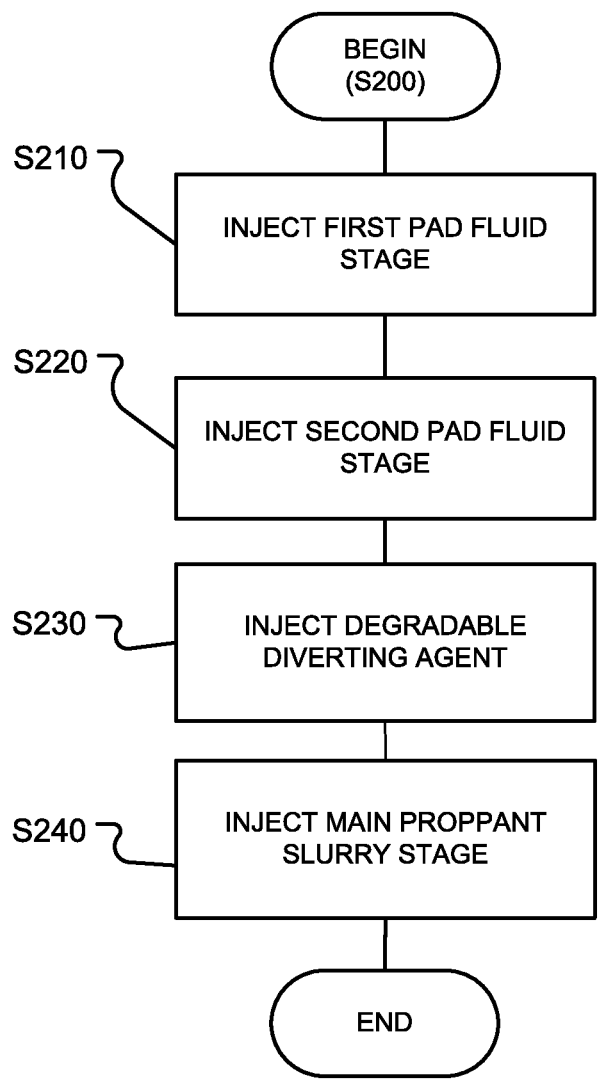
FIG. 2 illustrates an example of a method of propping created fractures and microfractures in tight formation according to an illustrative embodiment.

FIG. 2 shows an example of a method for propping created fractures during well operations. The method may include; (1) injecting a first pad fluid stage comprising an aqueous-based fluid at a rate above the fracturing gradient to create a fracture in the formation (Step 210); (2) injecting a second pad fluid stage comprising an aqueous-based fluid and a low concentration of a proppant mixture comprising small particles sizes (about 95% w/w of 140 mesh and smaller sizes), and larger proppant with D50 about 2 to 3 times the D50 of the smaller proppant (about 5% w/w), in order to extend the primary fracture and open up a natural or secondary induced fracture which allows the placement of the proppant mixture into fissures in the fractures which creates bridges in fracture areas with width restrictions or tortuous paths and still allow smaller proppants to be transported beyond the fracture areas (Step 220); (3) injecting a diverting agent stage comprising of small size degradable particulates to temporarily seal off or obstruct pore throats in smaller fractures that may be perpendicular to the one or more dominant fractures being formed in the formation, or to bridge pore throats of a proppant pack, allowing opening of new branches and microfractures, thereby, increasing fracture complexity with injection of the subsequent fluid stages (Step 230); Repeat (2) and (3) for one or more times; and (4) injecting a main proppant slurry stage comprising an aqueous-based fluid and a proppant wherein the proppant's size is larger than the small size proppant containing in the second pad fluid stage, and with proppant concentration higher than that containing in the second pad fluid stage while still incorporating low concentrations (about 0.1 lbm/gal) of larger sized particles to facilitate bridging and support of fractures with narrow, tortuous paths (Step 240).

The first pad fluid stage may or may not include a low concentration of small proppant materials (0.01 to 0.5 lbm/gal).

The second pad fluid stage may include a slurry of small proppant materials and/or a slurry of conventional proppant materials such as, for example, sand, man-made ceramic materials, and the like.

The proppant comprising small particle sizes may include about 1 micron to about 100 microns.

The above described method may be repeated in the same perforated interval or a different perforated interval after injecting a treatment volume of degradable diverting agent to temporarily seal off perforations connected with the primary proppant packed fracture.

This larger proppant particles may be high density, high strength materials that are resistant to crushing or low density more pliable materials that are more resistant to embedment or a combination of such materials. These materials may also act as nucleation sights where other proppant materials are captured to form larger propping structures to create highly conductive passages within the fracture system. This may be enhanced through the use of surface coatings on the larger sized particles, the proppant materials or both. The "high strength materials may include e.g., ceramic man-made proppant, sintered bauxite, and the like. The surface coating may include tactifying agents, such as, e.g., Halliburton SandWedge, or a resin such as Halliburton Expedite.

In one embodiment, particle sizes and particle concentrations of the proppant contained in the main proppant slurry stage is gradually increased to provide an effective proppant placement and to ensure successful opening of the dominant fractures and good connectivity between dominant fractures and microfractures in the complex fracture network. The particle sizes may range from 150 microns to 1,000 microns.

In yet another embodiment, the proppants contained in the second pad fluid stage and in the main proppant slurry stage are a mixture of proppants with different specific gravities, crush strengths, and degradability, such that once injected into the microfractures or dominant fractures, the proppant particulates can suspend, settle, form bridges, and/or pack, to ensure these fractures remain open with high conductivity. The ranges of the specific gravities may include 0.5 to 3.6. The crush strength may be greater than 50 psi. The degradability may occur via hydrolysis or enzymatic reaction. The main proppant slurry stage may include e.g., platelet, elongate, rod, fibrous, star, rod, fibrous, star, oval, cylindrical, rectangular, and the like.

The low density proppant tends to be neutrally suspended or buoyant while the high density proppant settles. Their combined actions, along with their various particle sizes, and the non-uniform roughness of fracture faces, greatly induces the bridging of the proppant materials between the fracture gaps to enhance the vertical proppant distribution. Once the fracture closure takes place, the proppant materials are locked in place.

The use of degradable particulates, along with frac sand or proppant allows the proppant pack to always remain permeable, or forming porous channels. The proppant pack may include about 5 weight percent to about 10 weight percent of degradable particulates. Proppant pack is grain to grain contact which forms a porous structure. The degradable particulates once dissolved and removed will leave voids. The proppant grains may be coated with a curable resin or consolidating agent to provide consolidation to the pack, holding the grains in place.

In another embodiment, a tackifying agent or a curable resin is coated on the proppant or may be part of the aqueous-based carrier fluid to provide cohesion between proppant grains or between the proppant grains and the fracture faces, thus enhancing vertical proppant distribution within the propped fracture. The tactifying agent may include e.g., non-aqueous tackifying agents, aqueous tackifying agents, silyl-modified polyamide compounds, resins (including curable resin compositions), crosslinkable aqueous polymer compositions, polymerizable organic monomer compositions, consolidating agent emulsions, zeta-potential modifying aggregating compositions, and binders. Examples may be found in U.S. Pat. Nos. 8,003,579, 7,956, 017, 7,825,074, 7,673,686, 7,392,847, 7,153,575, 6,677,426, 6,582,819, 6,439,309, 6,311,773, 6,287,639, 5,853,048, 5,839,510, 5,833,000, 5,249,627, and 4,585,064" or "curable resin" two-component epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof.

Instead of injecting micro-proppant with a single size-distribution and specific gravity into the created natural fractures or induced secondary fractures, this method as disclosed herein uses a mixture of micro-proppant and low concentration of large-size particulates, with lightweight particulates. Similarly, instead of single size distribution and specific gravity during a specific proppant stage into the created dominant fractures or branches, the method as disclosed herein uses a mixture of normal size proppant and a low concentration of large-size proppant, with lightweight particulates.

It is to be understood that the discussion of preferred embodiments regarding the treatment fluid or any ingredient in the pad fluid, is intended to apply to the composition embodiments and the method embodiments.

The treatment fluid (or pad fluid) can be, without limitation, a drilling fluid, spacer fluid, completion fluid, workover fluid, production enhancement fluid (e.g., fracturing and acidizing, perforating fluid), packer fluid, logging fluid, or a cementitious composition.

The pad fluid may include colloid, for example, a slurry, an emulsion, an invert emulsion, or a foam, VES. The pad fluid may include a base fluid. The base fluid can be the external phase of the colloid. The base fluid can be selected from the group consisting of an aqueous-based liquid, a hydrocarbon liquid, or combinations thereof. Preferably, the base fluid consists essentially of the aqueous fluid or the hydrocarbon liquid. The additive can be a liquid or a solid. For a solid additive, preferably the additive has a cross-sectional size in the range of about 60 to about 0.1 micrometers. For a colloid: the additive can be at least one of the internal phases of the colloid. By way of example, if the pad fluid is a foam, then the external phase of the foam can be the base fluid, the additive can be a liquid first internal phase, and a gas can be a second internal phase of the foam. By way of yet another example, the pad fluid can be a slurry wherein the base fluid is the external phase, the additive can be a solid first internal phase, and a liquid can be a second internal phase of the slurry. It is to be understood, that any of the phases of the colloid can include dissolved or undissolved materials.

The aqueous-based fluid for the base fluid may include water. The water can be selected from the group consisting of freshwater, brackish water, saltwater, and any combination thereof. The aqueous base fluid can further include a water-soluble salt. Preferably, the salt is selected from the group consisting of sodium chloride, calcium chloride, calcium bromide, potassium chloride, potassium bromide, magnesium chloride, and any combination thereof.

The aqueous base fluid may include Halliburton's common fluid system that covers a wide range of salt and crosslinker combinations such as, for example, Delta Frac™ fracturing fluid, a borate fracturing fluid; DeepQuest™ stimulation fluid, a weighted stimulation fluid; Hybor™ fluid, a delayed borate-crosslinked fluid using guar or hydroxypropyl gar gelling agent; OmegaFrac™ fluid system; pHaserFrac$^{SM}$ service fracturing fluid; Pur-Gel™ III fracturing fluid; SeaQuest$^{SM}$ service fracturing fluid; Siroc-co$^{SM}$ fracturing service fluid; SilverStim™ UR and LT fracturing fluid; Thermagel™ fluid; Versagel™ HT and LT system fluid.

The aqueous base fluid may be crosslinked or uncrosslinked systems that include, for example, Zr. Cr, Al, and the like.

The aqueous base fluid may further include e.g., friction reducers.

The hydrocarbon liquid for the base fluid can be selected from the group consisting of: crude oil; a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. The saturated hydrocarbon can be an alkane or paraffin. The paraffin can be an isoalkane (isoparaffin), a linear alkane (paraffin), or a cyclic alkane (cycloparaffin). The unsaturated hydrocarbon can be an alkene, alkyne, or aromatic. The alkene can be an isoalkene, linear alkene, or cyclic alkene. The linear alkene can be a linear alpha olefin or an internal olefin. The hydrocarbon liquid may further include Vis-O-Frac™ fluid; V-O-Gel™ fluid; My-T-Oil™ I, II, III, IV, V fluid; and MISCO2 Frac™ service.

The additive can be immiscible in the base fluid. By way of example, due to the oil- and water-repellant nature of the fluorinated compound additive, the additive can be immiscible in an oil-based or water-based pad fluid. As used herein, the term "immiscible" means that a non-homogenous fluid is formed. For example, a non-homogenous emulsion or invert emulsion can have creaming, flocculation or coalescing of the additive in the base fluid. It is to be understood that some homogeneity of the additive in the pad fluid can exist, but the majority of the additive is immiscible in the base fluid and will thus more readily seek out and interact with a surface of a component instead of being fully incorporated into the base fluid.

The aqueous-based fluid may further include one or more additional additives. Examples of additional additives include a fluid loss additive, lost-circulation material, viscosifier or suspending agent, sweeping agent, emulsifier, oxygen scavenger, a pH buffer, a weighting agent, an acid, proppant, an alkalinity source, a shale stabilizer, a biocide, a scavenger, a thinner, a flocculent, a deflocculant, a bridging agent, a breaker, and a dispersant. The additional additive can also be a fluorinated or perfluorinated compound. The exact additional additives that can be included depend on the type of treatment fluid being introduced into the well. For example, a drilling fluid might further include a weighting agent; an acidizing fluid might further include an acid; and a fracturing fluid might further include proppant.

The method includes the step of introducing various pad fluids into a well. The step of introducing can comprise pumping the pad fluid into the well. The well can be, without limitation, an oil, gas, or water production well, an injection well, or a geothermal well.

The following clauses represent additional embodiments of the disclosure:

Clause 1. A method of propping fractures and microfractures in tight formation comprising:
injecting into a wellbore a first pad fluid stage comprising an aqueous-based fluid at a rate above the fracturing gradient to create a fracture;
injecting into the wellbore a second pad fluid stage comprising an aqueous-based fluid and a low concentration of a proppant mixture comprising a slurry of small proppant materials;
injecting into the wellbore a diverting agent stage comprising a small size degradable particulate; and
injecting into the wellbore a main proppant slurry stage comprising an aqueous-based fluid and a proppant with a larger size than the small proppant particles in the second pad fluid stage.

Clause 2. The method according to Clause 1, wherein steps of injecting into the wellbore the second pad fluid stage, and injecting into the wellbore the diverting agent stage are repeated at least once prior to the injecting the main proppant slurry stage.

Clause 3. The method according to Clauses 1 or 2, wherein steps of injecting into the wellbore the second pad fluid stage, and injecting into the wellbore the diverting agent stage are repeated in a same perforated interval or for a new perforated interval.

Clause 4. The method according to Clauses 1 or 2, wherein the diverting agent comprises at least one of degradable particulates of polysaccharides, chitins, chitosans, proteins, aliphatic polyesters, poly(lactides), poly(glycolides), poly (.epsilon.-caprolactones), poly(hydroxybutyrates), polyanhydrides, aliphatic polycarbonates, poly(amino acids), poly (ethylene oxides), polyphosphazenes, coated rock salt, and combinations thereof.

Clause 5. The method according to Clauses 1 or 2, wherein the proppant mixture in the second pad fluid stage comprises a concentration of less than about 0.5 lbm/gal.

Clause 6. The method according to Clauses 1 or 2, wherein the small proppant materials in the second pad fluid stage comprise about 95% w/w of 140 mesh or smaller.

Clause 7. The method according to Clauses 1 or 2, wherein the first pad fluid stage comprises a low concentration of small proppant materials.

Clause 8. The method according to Clauses 1 or 2, wherein the proppant in the main proppant slurry stage comprises a concentration of less than about 0.1 lbm/gal of larger sized particles.

Clause 9. The method according to Clause 1, wherein the larger proppant particles comprise high density, high strength materials that are resistant to crushing or low density pliable materials that are more resistant to embedment or a combination of such materials.

Clause 10. The method according to Clause 9, wherein the high density, high strength materials comprises at least one of natural sand, ceramic bauxite proppant, steel balls, glass beads, and wherein the low density pliable materials comprises polymer composite beads.

Clause 11. The method according to Clause 1, wherein the larger proppant particles comprises coating on their surfaces.

Clause 12. The method according to Clause 1, wherein the proppant in the main proppant slurry stage comprises gradual increases of size and concentration of the proppant to provide an effective proppant placement in the fracture.

Clause 13. The method according to Clause 1, wherein the proppant in the second pad fluid stage and the main proppant slurry stage are mixture of proppants with different specific gravities, crush strengths, and degradability, such that once injected into the fracture, the proppants can suspend, settle, form bridges, and/or pack, to ensure that the fracture remains open with high conductivity.

Clause 14. The method according to Clause 1, wherein the proppant mixture comprises about 5 weight percent to about 10 weight percent of degradable particulates which allows the proppant to remain permeable, or form porous channels.

Clause 15. The method according to Clause 1, wherein the proppant is coated with a tackifying agent or a curable resin to provide cohesion between proppant and the fractures, thus enhancing vertical proppant distribution within the propped fracture.

Clause 16. The method according to Clause 1, wherein the aqueous-based fluid comprises a tackifying agent or a curable resin.

Clause 17. The method according to Clauses 15 or 16, wherein the tactifying agent further comprises at least one of non-aqueous tackifying agents, aqueous tackifying agents, silyl-modified polyamide compounds, resins, crosslinkable aqueous polymer compositions, polymerizable organic monomer compositions, consolidating agent emulsions, zeta-potential modifying aggregating compositions, and binders.

Clause 18. The method according to Clauses 15 or 16, wherein the curable resin comprises at least one of two-component epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof.

Clause 19. The method according to Clauses 1, 2, 13, 14, 15, or 16, wherein the injection is carried out using a pump.

Clause 20. A method of propping fractures and microfractures in tight formation comprising:

injecting into a wellbore a first pad fluid stage comprising an aqueous-based fluid at a rate above the fracturing gradient to create a fracture;

injecting into the wellbore a second pad fluid stage comprising an aqueous-based fluid and a slurry of small proppant materials;

injecting into the wellbore a diverting agent stage comprising small size degradable particulate; and injecting into the wellbore a main proppant slurry stage comprising an aqueous-based fluid and a proppant with a larger size than the small proppant particles in the second pad fluid stage.

What is claimed is:

1. A method of propping fractures in tight formation comprising:
   a) injecting into a wellbore a first pad fluid stage comprising a first aqueous-based fluid at a rate above a fracturing gradient to create fractures;
   b) injecting into the wellbore a second pad fluid stage comprising a second aqueous-based fluid and a proppant mixture comprising a slurry of small proppant particles comprising 95% w/w of 140 mesh or smaller, at 0.01 to 0.5 lbm/gal;
   c) injecting into the wellbore a diverting agent stage including a divergent agent comprising degradable particulates of at least one of polysaccharides, chitins, chitosans, proteins, aliphatic polyesters, poly(lactides), poly(glycolides), poly(.epsilon.-caprolactones), poly(hydroxybutyrates), polyanhydrides, aliphatic polycarbonates, poly(amino acids), poly(ethylene oxides), polyphosphazenes, coated rock salt, and combinations thereof; and
   d) repeating steps b and c at least one more time creating proppant packs in the fractures to create one or more propped fractures;
   e) after step (d), injecting into the wellbore only one main proppant slurry stage comprising a third aqueous-based fluid and a proppant with larger sized particles than the small proppant particles in the second pad fluid stage, the third aqueous-based fluid including a tackifying agent or a curable resin providing cohesion between a face of the fractures and at least one of the small proppant particles and the larger sized particles, enhancing vertical proppant distribution within the one or more propped fractures, wherein the main proppant slurry stage incorporates a concentration of about 0.1 lbm/gal of the larger sized particles; and
   f) during step (e), increasing particle concentrations of the proppant in the main proppant slurry stage and increasing the particle sizes in the main proppant slurry stage from about 150 microns to about 1,000 microns to provide proppant placement and to ensure opening of primary fractures.

2. The method according to claim 1, wherein steps b) and c) are repeated in a same perforated interval.

3. The method according to claim 1, wherein the first pad fluid stage comprises a concentration of small proppant materials of about 0.01 to 0.5 lbm/gal, the small proppant materials being about 1 micron to about 100 microns.

4. The method according to claim 1, wherein the larger sized particles comprise at least one of natural sand, ceramic bauxite proppant, steel balls, glass beads, and polymer composite beads.

5. The method according to claim 1, wherein the larger sized particles include a coating on their surfaces.

6. The method according to claim 1, wherein the proppant mixture in the second pad fluid stage and the main proppant slurry stage further comprise a mixture of proppants with different specific gravities, crush strengths, and degradability, such that once injected into the wellbore, the mixture of proppants suspend, settle, form bridges, or pack, to ensure that the fractures remain open with conductivity.

7. The method according to claim 1, wherein the proppant in the main proppant slurry stage comprises about 5 weight percent to about 10 weight percent of degradable particulates which allows the proppant to remain permeable, or form porous channels.

8. The method according to claim 1, wherein at least one of the small proppant particles and the larger sized particles is coated with the tackifying agent or the curable resin to provide cohesion between proppant and the one or more propped fractures, thus enhancing vertical proppant distribution within the propped fractures.

9. The method according to claim 8, wherein the at least one of the small proppant particles and the larger sized particles is coated with the tackifying agent and the tackifying agent further comprises at least one of non-aqueous tackifying agents, aqueous tackifying agents, silyl-modified polyamide compounds, a resin, crosslinkable aqueous polymer compositions, polymerizable organic monomer compositions, consolidating agent emulsions, zeta-potential modifying aggregating compositions, and binders.

10. The method according to claim 8, wherein the at least one of the small proppant particles and the larger sized particles is coated with the curable resin, the curable resin comprises at least one of two-component epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof.

11. The method according to claim 1, wherein at least one of the injection steps is carried out using a pump.

12. The method of claim 1, wherein the divergent agent comprises degradable particulates including a plurality of: chitins, chitosans, proteins, aliphatic polyesters, poly(.epsilon.-caprolactones), poly(hydroxybutyrates), polyanhydrides, aliphatic polycarbonates, poly(ethylene oxides), polyphosphazenes, and coated rock salt.

13. A method of propping fractures in tight formation comprising:
    a) injecting into a wellbore a first pad fluid stage comprising a first aqueous-based fluid at a rate above a fracturing gradient to create fractures;
    b) injecting into the wellbore a second pad fluid stage comprising a second aqueous-based fluid and a slurry of small proppant particles of about 1 micron to 100 microns, the slurry comprising a mixture of proppants having different specific gravities, different crush strengths and different degradability;
    c) injecting into the wellbore a diverting agent stage including a divergent agent comprising degradable particulates of at least one of chitins, chitosans, proteins, aliphatic polyesters, poly(.epsilon.-caprolactones), poly(hydroxybutyrates), polyanhydrides, aliphatic polycarbonates, poly(amino acids), poly(ethylene oxides), polyphosphazenes, coated rock salt, and combinations thereof;
    d) repeating steps b and c at least one more time creating proppant packs in the fractures to create one or more propped fractures; and
    e) after step (d), injecting into the wellbore only one main proppant slurry stage comprising a third aqueous-based fluid and a proppant with larger sized particles than the small proppant particles in the second pad fluid stage for propping the fractures, the third aqueous-based fluid including a tackifying agent or a curable resin providing cohesion between a face of the fractures and at least one of the small proppant particles and the larger sized particles, enhancing vertical proppant distribution within the one or more propped fractures, wherein the main proppant slurry stage incorporates a concentration of about 0.1 lbm/gal of the larger sized particles; and
    f) during step (e), increasing particle concentrations of the proppant in the main proppant slurry stage and increasing the particle sizes in the main proppant slurry stage from about 150 microns to about 1,000 microns to provide proppant placement and to ensure opening of primary fractures.

14. The method of claim 13, wherein the degradable particulates degrade by enzymatic reaction.

15. The method of claim 13, wherein the divergent agent comprises degradable particulates including a plurality of: chitins, chitosans, proteins, aliphatic polyesters, poly(.epsilon.-caprolactones), poly(hydroxybutyrates), polyanhydrides, aliphatic polycarbonates, poly(ethylene oxides), polyphosphazenes, and coated rock salt.

16. The method of claim 15, wherein the degradable particulates dissolve leaving voids in the proppant packs forming porous channels, the tackifying agent or the curable resin providing cohesion between the face of the fractures and the proppant packs.

* * * * *